(12) United States Patent
Kauppila

(10) Patent No.: US 7,878,463 B2
(45) Date of Patent: Feb. 1, 2011

(54) SHAFT SEAL MOUNTING AND METHOD

(76) Inventor: Richard W. Kauppila, 158 S. Basin Dr., Negaunee, MI (US) 49866

( * ) Notice: Subject to any disclaimer, the term of this patent is extended or adjusted under 35 U.S.C. 154(b) by 927 days.

(21) Appl. No.: 11/533,844

(22) Filed: Sep. 21, 2006

(65) Prior Publication Data
US 2007/0221792 A1    Sep. 27, 2007

Related U.S. Application Data

(60) Provisional application No. 60/719,739, filed on Sep. 22, 2005.

(51) Int. Cl.
*F16L 3/00* (2006.01)

(52) U.S. Cl. .............. 248/65; 174/151; 16/2.1; 248/56

(58) Field of Classification Search .......... 248/46, 248/65, 6, 655, 219.1, 219.4, 230.3; 174/668, 174/151, 152 R, 153 R, 153 G; 16/2.1, 2.2
See application file for complete search history.

(56) References Cited

U.S. PATENT DOCUMENTS

| | | | |
|---|---|---|---|
| 5,421,127 A * | 6/1995 | Stefely | 52/1 |
| 5,774,951 A | 7/1998 | Close et al. | |
| 5,789,706 A * | 8/1998 | Perkins | 285/136.1 |
| 5,803,615 A * | 9/1998 | Cohn | 384/428 |
| 6,010,134 A * | 1/2000 | Katoh | 277/615 |
| 6,490,947 B2 * | 12/2002 | Burger | 74/502.4 |
| 6,540,531 B2 * | 4/2003 | Syed et al. | 439/98 |
| 6,616,326 B2 | 9/2003 | White | |
| 6,627,817 B1 * | 9/2003 | Kortenbach | 174/74 R |
| 7,005,579 B2 * | 2/2006 | Beele | 174/653 |
| 7,422,181 B2 * | 9/2008 | Sussenbach | 248/56 |
| 7,534,965 B1 * | 5/2009 | Thompson | 174/153 G |

\* cited by examiner

*Primary Examiner*—Terrell Mckinnon
*Assistant Examiner*—Steven M Marsh
(74) *Attorney, Agent, or Firm*—John R. Benefiel

(57) ABSTRACT

A shaft seal mounting assembly and method including a pair of semicircular ring segments assembled onto a shaft with a seal held therein engaging the shaft. A flat surface on the base structure holding the ring segments is held against a wall surface extending around a hole through which the shaft passes by a camming arrangement comprised of slotted studs fixed to the wall and received in openings in the base structure. A slotted locking slide bar is received in each stud slot and captured by a cross pin extending through the slot in a respective bar, the side bar slot sloping so as to cam the base structure towards the wall surface when the locking slide bar is driven through the stud slot.

6 Claims, 3 Drawing Sheets

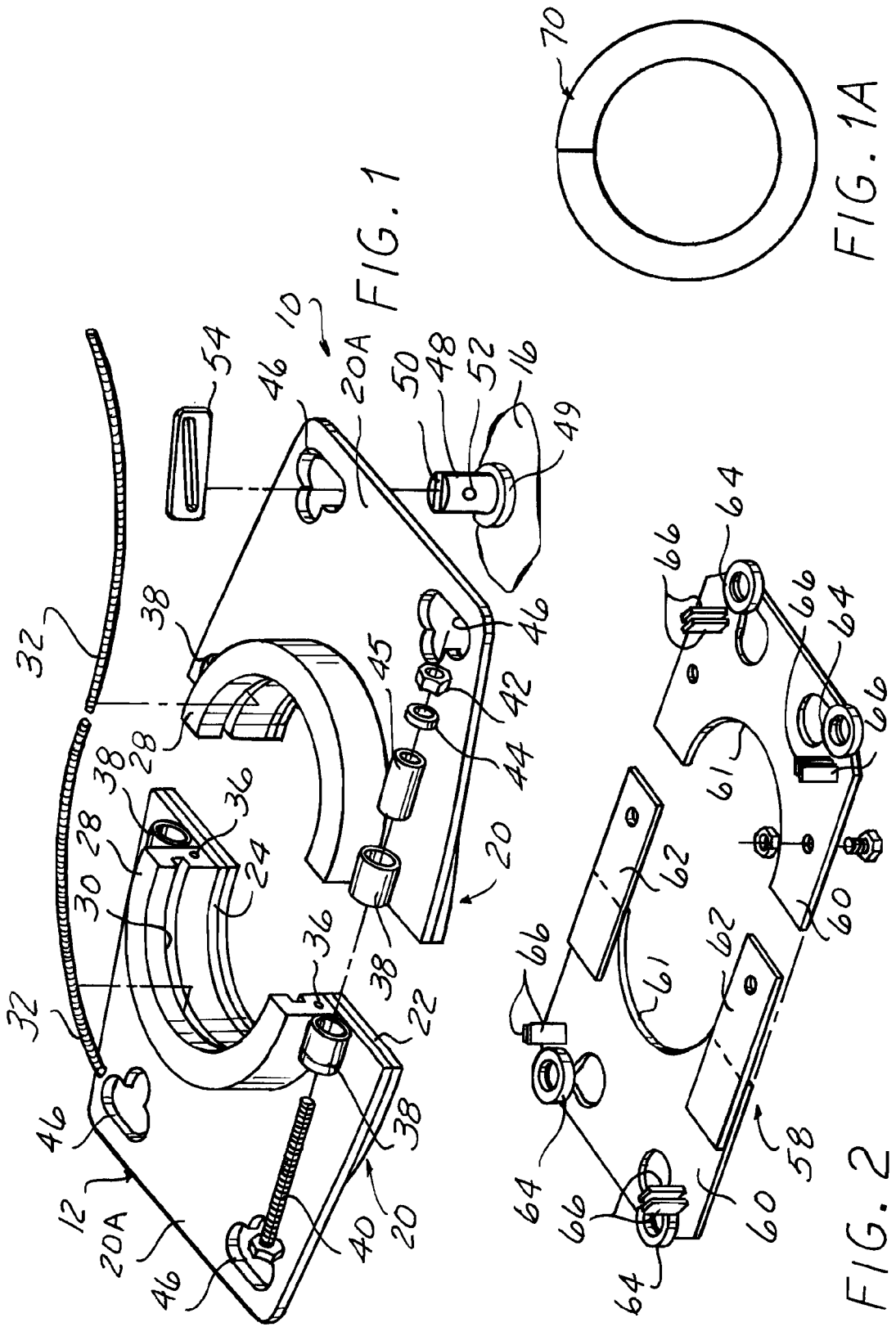

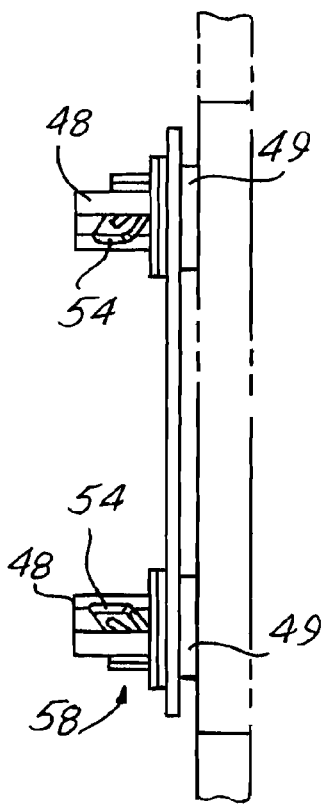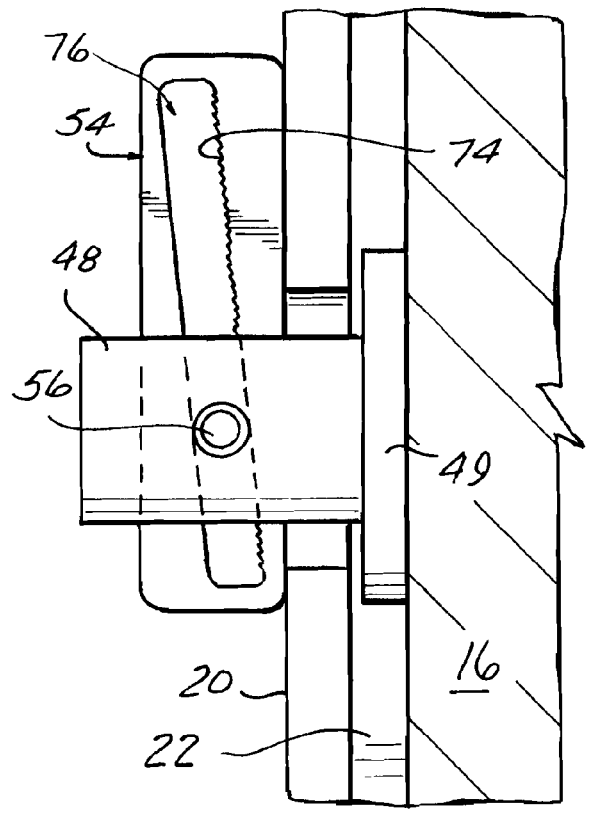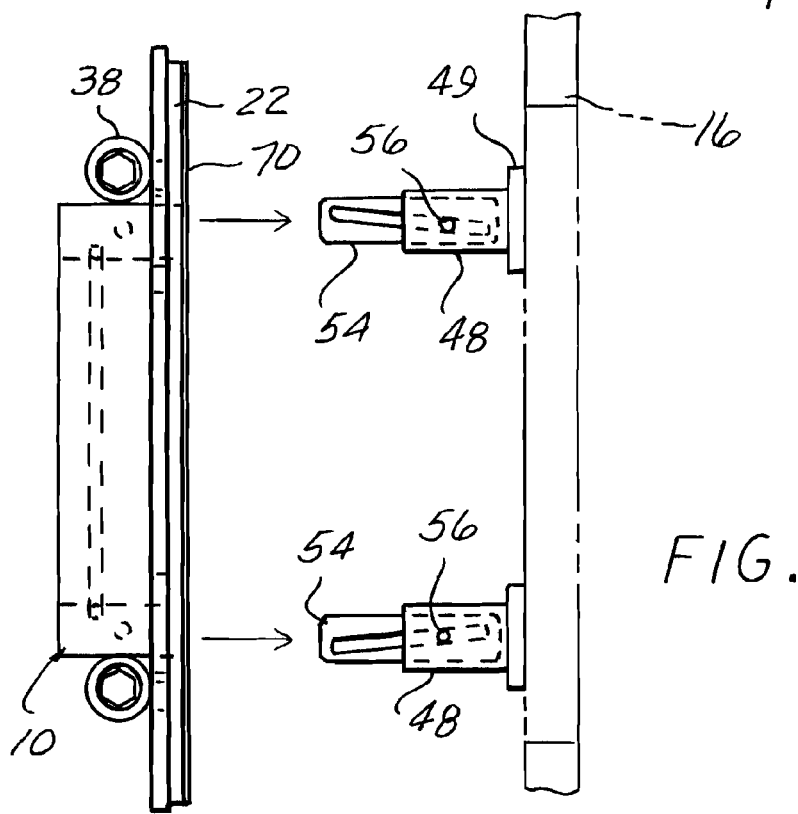

SHAFT SEAL MOUNTING AND METHOD

CROSS REFERENCE TO RELATED APPLICATIONS

This application claims the benefit of U.S. provisional application No. 60/719,739 filed on Sep. 22, 2005.

BACKGROUND OF THE INVENTION

This invention concerns shaft sealing mountings and more particularly mountings for such shaft seals used in industrial applications such as in steel making apparatus in which a shaft passes through a hole in a wall of an enclosure with a considerate clearance therebetween. In these applications, the passage of gases into and out of the enclosure is typically undesirable, and seals are provided due to the considerable clearance between the hole and shaft. This clearance is required since the hole must be large enough to accommodate lateral shaft movements resulting from bearing wear adjustments, temperature shift induced expansion and contraction, etc.

Seal mountings presently in use in such applications are complex and costly, are difficult to disassemble for maintenance, do not allow lateral shaft adjustments, and do not seal well.

It is the object of the present invention to provide a shaft seal mounting which is simpler and less costly than existing shaft seals for such described applications, and which seals effectively.

It is a further object to provide such a shaft seal mounting which allows easy replacement while accommodating and lateral adjustment of the shaft position with in the enclosure wall hole.

SUMMARY OF THE INVENTION

The above recited objects and other objects which will become apparent upon a reading of the following specification and claims are achieved by a shaft seal mounting comprised of a pair of parts, each part having a ring segment attached to a base structure having aligned semicircular cutouts matched to the ring segments. A seal packing segment received in a groove in each of the ring segments which together enclose the shaft when the parts are assembled together around a shaft. The base structures each include an annular disc sized to cover the enclosure wall hole which disc is welded to an elongated generally rectangular plate having four outer corners formed with elongated openings allowing adjustments of the seal mounting in two orthogonal directions on four studs as described below.

A clamp arrangement is provided to enable a bottom surface of the parts 12 of the mounting 10 to be held against an inside surface of the wall to be sealed thereagainst.

The clamp arrangement includes four slotted studs attached to project from the enclosure wall in a pattern matching the corner openings on the two base structures, the studs preferably welded to the wall by the aid of a jig.

The two mounting parts are connected together, centered on the shaft by a suitable attachment of the two parts, preferably by two circumferentially extending bolts received in respective aligned tubes attached to each base structure. The two seal packing segments engage the shaft to create a rotary sealing of the shaft.

The assembled base structures of the two mounting parts are then advanced along the shaft and onto the studs with captured slotted bars held on each stud swung out to be passed through the corner openings of the base structures and thereafter pivoted down about cross pins holding each bar to a respective stud.

The bars are then driven in a lengthwise direction causing a camming action between the bars and cross pins to cause a bottom surface of the assembled base structure to be forced against the adjacent enclosure wall surface with the annular disc covering the clearance about the enclosure wall hole. A thin gasket can be interposed between the annular disc plate and enclosure wall to sealing accommodate any out of flatness condition of the wall.

The elongations of the base structure corner openings accommodates any adjustments necessary in the positioning of the mounting relative to the enclosure wall as to enable take up shaft wear, or for other reasons as described above.

The two parts can be disassembled from each other to be removed for seal replacement or repair without the need for removal of the shaft, to simplify maintenance procedures.

DESCRIPTION OF THE DRAWINGS

FIG. 1 is an exploded pictorial view of components of a seal mounting arrangement according to the present invention.

FIG. 1A is an end view of a gasket used to seal the seal mounting assembly to an enclosure wall.

FIG. 2 is an exploded pictorial view of components of a jig preferably used in field welding four studs included in the seal mounting to an enclosure wall in which the hole to be sealed is formed.

FIG. 5 is a side view of the installation jig and studs in position against an enclosure wall, shown in phantom lines.

FIG. 6 is a side view of the seal mounting in position preparatory to being installed on projecting studs welded to the inside surface of the enclosure wall.

FIG. 7 is an enlarged side view of a slotted locking slide bar installed in a stud with fragmented portions of the mounting parts and enclosure wall being drawn together, and showing in exaggerated form an uneven contouring of a lower side of the slot.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 3:
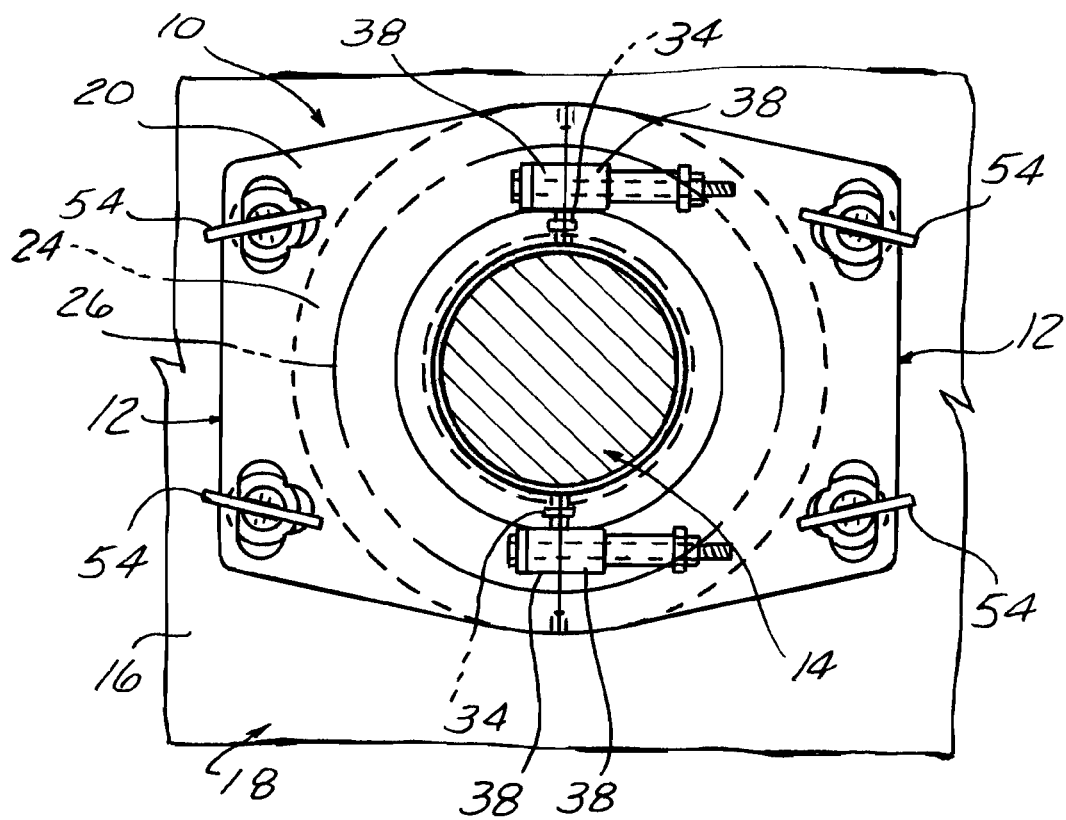
FIG. 3 is an end view of the mounting arrangement installed on a shaft shown in section on a portion of an enclosure wall shown in fragmentary form.
Figure 4:
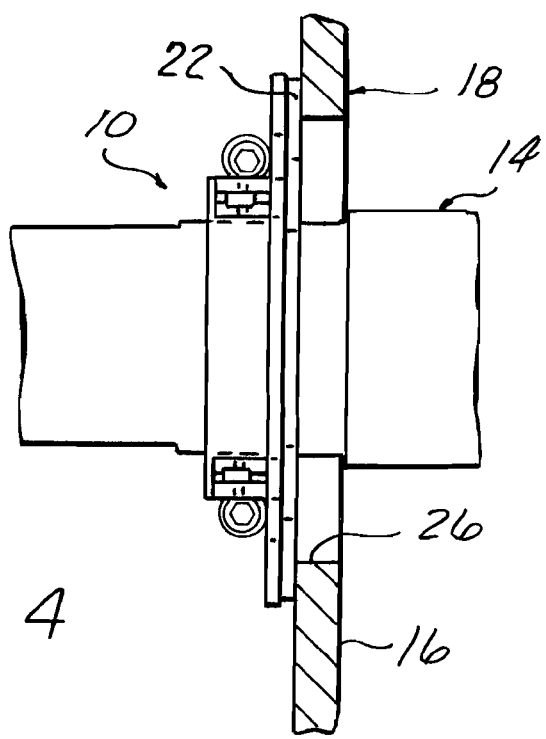
FIG. 4 is a side view of the mounting arrangement and shaft shown in FIG. 3, with adjacent enclosure wall portions shown in section.

Referring to the Drawings and particularly FIGS. 1, 3 and 4, the major components of a seal mounting assembly 10 according to the invention is shown.

This includes two identical mounting parts 12 which are assembled together onto a shaft 14 so as to be centered thereon and drawn against the inside surface of wall 16 of an enclosure 18 when installation is completed.

The parts 12 may each be comprised of weldments which have segments of a complete bore which is preferably machined with the parts temporarily assembled together for machining.

A base structure 20 of each mounting part 12 includes a semicircular annular plate 22 welded to one side of each of generally rectangular flat plates 20A, aligned with a semicircular cutout 24 in the base structure 20. The semicircular annular plates 22 together have a larger diameter than that of a shaft hole 26 in the enclosure wall 16 so as to completely cover the same when installed. The outside diameter of semicircular annular plates 22 are preferably located to be tangent to a rounded center portion of the base structure plates 20A.

A ring segment 28 is welded onto the opposite side of each base structure 20, aligned with the cutout 24 and semicircular annular plate 22, so that the plates 20A extend radially outward from the outer perimeter of the ring segments 28 as seen in FIG. 1.

A groove 30 is machined into the ID of the ring segments 28, adapted to receive a respective rope seal or packing 32.

Preferably, the two parts 12 have previously been assembled together using locator pins 34 fit into aligned holes 36 in each face of the ring segments 28 and the bore so formed is thereafter machined with the groove 30 also machined into the ID thereafter.

Each ring segment 28 has a pair of short tubes 38 welded on opposite sides of the perimeter thereof extending tangentially thereto. The ring segments may be made by cutting a single pipe section in two.

An elongated bolt 40 is received through each set of tubes 38 and retained with a nut 42 and washer 44.

A sacrificial extension tube 45 is also included for each bolt 40, which allows the bolts 40 to be easily removed by cutting through the tubes 45 and bolt 54 and leaving an exposed bolt end upon removal of the sections of the tube 45 which bolt can then be driven out.

The base structure plates 20A are each generally rectangular having four rounded corners, with the bottom and top sides sloping out slightly to be tangential to the perimeters of the semi annular plates 22 as seen in FIG. 3.

A hole 46 elongated in two directions is formed at each corner of each of the base structure plates 20A each able to receive a respective slotted stud 48 welded projecting from the enclosure wall 16 in a pattern matching that of the holes 46.

The elongation of the holes 46 allows lateral adjustments of the mounting assembly 10 along two orthogonal axes on the studs 48.

The studs 48 form part of a clamp arrangement for pressing a surface of the semicircular annular plates 22 of the base structure 20 against the inside surface of the wall 16 extending around the shaft hole 26.

Each stud 48 has an axially extending central slot 50 and an intersecting radial cross hole 52.

An elongated locking slotted slide bar 54, also forming part of the clamp arrangement, is received in each stud slot 50 and captured by a roll pin 56 inserted in cross hole 52, each comprising cam elements as described below.

A two-piece welding jig 58 (FIG. 2) may be used to assist in field welding the studs 48 projecting from the wall 16 in the required pattern. The jig 58 includes two flat plates 60 which can be assembled together in the field over the shaft 14, which is accommodated by cutouts 61. The assembly is carried out used bridging pieces 62 welded to one plate and bolted to the other as indicated in FIG. 2. Locator rings 64 are welded at each corner to receive a respective stud and spaced locator blades 66 to correctly orient the stud slots and locking slide bars 46, as shown in FIG. 5.

The studs 48 each have a base portion 49 which is welded to the walls with the jig 58 held in position against the wall 16. Enlargements 68 provide access to the base portion 49 for tack welding the studs 48, which welding can be completed after the jig 58 is removed.

An annular gasket 70 (FIG. 1A), slit for assembly onto the shaft 14, may be included if the enclosure wall inner surface may not be completely flat, interposed between the semicircular annular plates 22 and the inner surface of the wall 16 (FIG. 6).

The locking slide bars 54 can be turned out to be roughly aligned with the studs 48 so as to be able to pass through the corner holes 46 at assembly and thereafter flipped out to their operational orientation shown in FIG. 7.

By driving the locking slide bars 54 into the stud slots 50, the camming reaction between the roll pins 56 and the lower surface 74 of the bar slot 76 draws the annular plates 22 tightly against inside surface of the enclosure wall 16 to seal the hole 26 with respect to the mounting 10. The shaft 14 is sealed with respect to the ring segments 58 with the seals 32.

The bottom side 74 of each slide bar slot 76 is formed with a series of shallow (0.005 inches deep) depressions, notches or other features to create unevenness and provide a strong frictional engagement with the associated roll pin 56 to securely hold the slotted locking bars 54 in their advanced positions forcing the shaft seal mounting 10 against the inside surface of the enclosure wall 16.

See U.S. Pat. No. 5,774,951 where details of a clamp of this type is described in detail, there described in combination with a conveyor belt skirt plate.

The invention claimed is:

1. A method of creating a rotary seal between a rotatable shaft passing through a hole in a wall with a substantial open clearance space between said shaft and a perimeter of said hole comprising:

forming a pair of semicircular ring segments each with an attached generally flat base structure extending radially out from substantially the entire outer perimeter of each of said ring segments;

assembling said semicircular ring segments to each other and onto said shaft to encircle the same with a seal contained within said assembled ring segments pressed into engagement with said rotatable shaft to create a rotary seal; and pressing a surface of said base structure attached to each of said assembled ring segments against a wall surface extending radially outward and around a perimeter of said hole to seal said clearance space between said shaft and said perimeter of said hole surface by clamping a surface of each of said base structures against said wall surface by affixing projecting studs to said wall surface and forming respective openings in said base structures located to receive said studs; and, mating cam elements to respective studs so as to force said base structures against said radially outward extending wall surface around a perimeter of said hole to seal said shaft clearance space.

2. The method according to claim 1 wherein each of said cam elements are provided by locking slide bars received in a slot in a respective stud, forming a sloping slot in each of said slide bars and mounting a cross pin in each stud passing through said slot in a respective slide bar, and advancing each slide bar in said stud slot to cam said surface of said base structures against said radially extending surface.

3. The method according to claim 2 further including forming a surface of one side of said slot in each of said slide bars so as to increase the friction with a respective cross pin.

4. The method according to claim 1 further including interposing a gasket between said base structure surface and said wall surface to achieve complete sealing of said clearance space.

5. The method according to claim 1 wherein said semicircular ring segments are assembled onto said shaft by being clamped together to define a circular opening for said shaft and to compress said seal against said shaft.

6. The method according to claim 1 wherein said pressing of each base structure surface against said radially outward extending wall surface is done so as to allow limited radial adjusting movement of said assembled ring segments and base structures and said shaft and said hole.

* * * * *